United States Patent
Ishihara et al.

(10) Patent No.: US 8,133,314 B2
(45) Date of Patent: Mar. 13, 2012

(54) INK COMPOSITION, RECORDING METHOD USING THE SAME, AND RECORDED MATTER

(75) Inventors: Daisuke Ishihara, Shiojiri (JP); Miharu Kanaya, Azumino (JP); Chie Maruyama, Matsumoto (JP); Masaru Kumagai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/730,733

(22) Filed: Mar. 24, 2010

(65) Prior Publication Data

US 2010/0247874 A1    Sep. 30, 2010

(30) Foreign Application Priority Data

Mar. 25, 2009  (JP) .................................. 2009-074493
Feb. 17, 2010  (JP) .................................. 2010-032683

(51) Int. Cl.
*C09D 11/02*   (2006.01)

(52) U.S. Cl. .................................................. 106/31.86

(58) Field of Classification Search ................. 106/31.86
See application file for complete search history.

(56) References Cited

U.S. PATENT DOCUMENTS

| 5,580,373 A | 12/1996 | Lane et al. | |
|---|---|---|---|
| 2005/0284332 A1* | 12/2005 | Shinjo et al. | ............... 106/31.27 |

FOREIGN PATENT DOCUMENTS

| JP | 09-176538 | 7/1997 |
|---|---|---|
| JP | 10-272828 | 10/1998 |
| JP | 10-316915 | 12/1998 |
| JP | 2005-132907 | 5/2005 |
| JP | 2008-231132 | 10/2008 |

OTHER PUBLICATIONS

Patent Abstract of Japan 09-176538 Published Jul. 8, 1997.
Patent Abstract of Japan 10-272828 Published Oct. 13, 1998.
Patent Abstract of Japan 10-316915 Published Dec. 2, 1998.
Patent Abstract of Japan 2005-132907 Published May 26, 2005.
Patent Abstract of Japan 2008-231132 Published Oct. 2, 2008.

* cited by examiner

*Primary Examiner* — Jerry Lorengo
*Assistant Examiner* — Veronica F Faison
(74) *Attorney, Agent, or Firm* — Ladas & Parry LLP

(57) ABSTRACT

An ink composition includes at least a pigment, a humectant, and water in from 10 to 60% by weight to the total amount of ink. The humectant is a mixture of (A) at least one compound selected from glycerin, 1,2,6-hexanetriol, diethylene glycol, triethylene glycol, tetraethylene glycol, and dipropylene glycol; (B) either trimethylol propane or trimethylol ethane, or a mixture thereof; and (C) at least one compound selected from betaines, saccharides, and ureas and having a molecular weight in the range of from 100 to 200, at a content weight ratio of (A):(B):(C) of 1.0:0.1 to 1.0:1.0 to 3.5.

8 Claims, No Drawings

INK COMPOSITION, RECORDING METHOD USING THE SAME, AND RECORDED MATTER

BACKGROUND

1. Technical Field

The present invention relates to an ink composition, a recording method using the same, and a recorded matter thereby. Further specifically, the invention relates to an ink composition excellent in viscosity-temperature characteristics of ink, cockling and curling characteristics, and fixation properties, and relates to an ink jet recording method and a recorded matter.

2. Related Art

An ink jet recording system is a recording method for conducting printing by letting ink droplets fly from an ink jet head and attach them to a recording medium such as paper. Because of recent innovative progress in ink jet recording technology, the ink jet recording method has been also used in the field of highly fine image recording (printing), which was ever achieved only by photograph or offset printing.

The ink used in such an ink jet recording method is required to have adequate physical characteristic values to be discharged from an ink jet head and controlled as fine ink droplets. In particular, it is preferred to have a lower viscosity compared to that of a common printing ink composition. As one method therefor, ink containing a high amount of water (aqueous ink) is widely used.

Paper exclusively used for ink jet printing has an ink-absorbing layer for absorbing ink and thereby has a problem of high cost. Plain paper such as copy paper does not have the ink-absorbing layer and therefore is inexpensive, but has problems relating to penetration of ink such as strike-through (a phenomenon that printed ink passes through a recording medium and the image appears on the reverse face) and bleeding and also problems of curling of plain paper after printing an image and unevenness (cockling) of a printed area.

Against the above-mentioned problems, a recording method by measuring wetting time to a recording medium and absorption coefficient by a Bristow method and using ink of which penetration properties are improved is proposed (for example, refer to JP-A-10-316915). However, in this method, since the colorant in the ink also penetrates into plain paper together with the ink, the method has problems that the printing quality is insufficient and that strike-through is significant. In particular, the method is unsuitable for both-side printing.

Furthermore, methods for improving the curling and the cockling of paper are proposed, for example, an ink jet ink containing a specific amide compound, pyridine derivative, imidazoline compound, or urea compound as a curling-preventing agent (for example, JP-A-9-176538) or an ink jet recording method for optimizing curling balance by providing a solution containing water to the reverse face side of an image-printing face (for example, JP-A-10-272828). However, known curling-preventing agents cannot prevent cockling and are also insufficient in curling preventing effect. In addition, the method providing a solution containing water to the reverse face has problems that a large printing apparatus is necessary and also that cockling becomes serious.

Furthermore, instead of the aqueous ink, non-aqueous ink has been also investigated. The non-aqueous ink has advantages that curling and cockling tend to not occur even in printing on plain paper, compared to aqueous ink. In such non-aqueous ink, since the ink containing a volatile solvent has an environmental problem, recently, it has been tried to use a solvent derived from vegetable oil that is low in environmental load (for example, JP-A-2005-132907). However, since such oil-based ink has high penetration properties to plain paper, the oil-based ink has problems that the printing quality is insufficient and that strike-through is significant. In particular, the ink is unsuitable for both-side printing.

Against these problems, an ink containing a low amount of water has been proposed. By reducing the content of water in the ink, the content of other components contained in the ink is increased. Depending on the components contained in the ink, the ink has a problem that the viscosity of the ink at low temperature (for example, at 10° C.) tends to increase, and conversely, the viscosity at high temperature (for example, 40° C.) tends to decrease.

If the viscosity is largely increased or decreased with temperature, the voltage signal applied to an ink jet head becomes too high, or treatment becomes complicated.

SUMMARY

An advantage of some aspects of the invention is to provide an ink composition showing a small difference in viscosity regardless of the change of ink temperature and also excellent curling and cockling characteristics to plain paper and color development properties, and also provide a recording method using the composition and a recorded matter thereby.

The invention can be achieved by the following embodiment or application examples.

The present inventors have conducted intensive studies and, as a result, have found that in an ink composition including at least a pigment, a humectant, and water in from 10 to 60% by weight to the total amount of ink, when the humectant is a mixture of the following compounds (A), (B), and (C):

(A) at least one compound selected from glycerin, 1,2,6-hexanetriol, diethylene glycol, triethylene glycol, tetraethylene glycol, and dipropylene glycol, (B) either trimethylol propane or trimethylol ethane, or a mixture thereof, and (C) at least one compound selected from betaines, saccharides, and ureas and having a molecular weight in the range of from 100 to 200, at a content weight ratio of (A):(B):(C) of 1.0:0.1 to 1.0:1.0 to 3.5, the ink can have excellent viscosity-temperature characteristics and show excellent curling and cockling characteristics to plain paper and color development properties. Thus, the invention has been accomplished.

The invention is based on these findings, and the constitution of the invention is as follows:

(1) An ink composition including at least a pigment, a humectant, and water in from 10 to 60% by weight to the total amount of ink, wherein the humectant is a mixture of the following compounds (A), (B), and (C):

(A) at least one compound selected from glycerin, 1,2,6-hexanetriol, diethylene glycol, triethylene glycol, tetraethylene glycol, and dipropylene glycol, (B) either trimethylol propane or trimethylol ethane, or a mixture thereof, and (C) at least one compound selected from betaines, saccharides, and ureas and having a molecular weight in the range of from 100 to 200, at a content weight ratio of (A):(B):(C) of 1.0:0.1 to 1.0:1.0 to 3.5;

(2) The ink composition according to the above (1), wherein the concentration of the pigment contained in the ink composition is 6% by weight or more;

(3) The ink composition according to the above (1) or (2), the ink composition further including a resin emulsion;

(4) The ink composition according to the above (3), wherein the resin emulsion has a lowest film-forming temperature of lower than 20° C.;

(5) The ink composition according to any of the above (1) to (4), wherein the viscosity value of the ink composition at 20° C. is from 5 to 20 mPa·s;

(6) A ink jet recording method comprising discharging droplets of an ink composition according to any of the above (1) to (5) and making the droplets adhere to a recording medium; and (7) A recorded matter recorded by the recording method according to the above (6).

DESCRIPTION OF EXEMPLARY EMBODIMENTS

The ink composition of the invention will be described in detail based on an exemplary embodiment below.

From the viewpoints of safety and handling, the ink composition of the embodiment is preferably an aqueous ink of which main solvent is water, and the water is preferably pure water or ultrapure water, such as ion-exchanged water, ultrafiltered water, reverse osmosis water, or distilled water. In particular, use of water sterilized with, for example, ultraviolet irradiation or addition of hydrogen peroxide prevents occurrence of mold and bacteria to allow the ink to be stored for a long period of time and is therefore preferred. The water is preferably contained in the ink in an amount of from 10 to 60% by weight from the viewpoints of ensuring adequate physical characteristic values (such as viscosity) of the ink and ensuring stability and reliability of the ink.

By controlling the amount of water contained in the ink to the above-mentioned range, the amount of water absorbed by the cellulose of plain paper is suppressed compared to the cases of known ink compositions. As a result, the cellulose can be prevented from swelling which is believed as a cause of cockling and curling.

In the embodiment, the term "plain paper" means paper that is usually made of pulp as main raw material and used in, for example, a printer. The plain paper is defined in JIS P 0001 No. 6139 and specific examples thereof include high-quality paper, PPC copy paper, and non-coated printing paper. The plain paper may be those commercially available from various companies, and various kinds of paper, such as Xerox 4200 (manufactured by Xerox) and GeoCycle (manufactured by Gerogia-Pacific), can be used.

When the water content is lower than 10% by weight, the fixation properties to a recording medium may be decreased. On the other hand, when the water content is higher than 60% by weight, cockling and curling tend to occur in printing to a recording medium having an absorbing layer of paper support that is low in ink-absorbing properties, as in known aqueous ink compositions.

The viscosity of the ink in the temperature range of from 10 to 40° C. are influenced by temperature characteristics of the colorant, humectant, solvent, and so on that are contained in the ink. Among them, the influence of the humectant is particularly high, and the viscosity tends to be further increased at 10° C. and tends to be further decreased at 40° C. in some cases of a type of the humectant, an addition amount, or a content ratio. Note that in the present specification, when a difference in viscosity of ink in the temperature range of from 10 to 40° C. is further small, it is indicated as that the viscosity-temperature characteristics of the ink are excellent.

The humectant used in the embodiment is, from the viewpoint of well-balanced curling and cockling characteristics, strike-through characteristics, clogging characteristics, and viscosity-temperature characteristics of the ink, preferably composed of:

(A) at least one compound selected from glycerin, 1,2,6-hexanetriol, diethylene glycol, triethylene glycol, tetraethylene glycol, and dipropylene glycol;

(B) either trimethylol propane or trimethylol ethane or a mixture thereof; and (C) at least one compound selected from betaines, saccharides, and ureas and having a molecular weight in the range of 100 to 200, at a content weight ratio of (A):(B):(C)=1.0:0.1 to 1.0:1.0 to 3.5.

The humectant selected from the group (A) is a material having an effect against clogging and also having an effect against curling and cockling. However, the material is low in strike-through characteristics due to the excellent penetration properties to a recording medium.

The humectant selected from the group (B) is a material having an effect against clogging and is excellent in strike-through characteristics because of its penetration-preventing effect.

The humectants selected from the groups (A) and (B) have characteristics showing a large difference in viscosity in the ink temperature range of from 10 to 40° C. Therefore, the viscosity-temperature characteristics of the ink are highly influenced according to an increase in the amounts of these humectants in the ink, and the difference in viscosity in the ink temperature range of from 10 to 40° C. is also increased.

The humectant selected from the group (C) is a material particularly excellent in curling and cockling characteristics and also excellent in viscosity-temperature characteristics. Examples of such a humectant include betaines that are N-trialkyl substitution products of amino acids, such as glycine betaine (molecular weight: 117), γ-butyrobetaine (molecular weight: 145), homarine (molecular weight: 137), trigonelline (molecular weight: 137), carnitine (molecular weight: 161), homoserine betaine (molecular weight: 161), valine betaine (molecular weight: 159), lysine betaine (molecular weight: 188), ornithine betaine (molecular weight: 176), alanine betaine (molecular weight: 117), stachydrine (molecular weight: 185), and glutamic acid betaine (molecular weight: 189); saccharides such as glucose (molecular weight: 180), mannose (molecular weight: 180), fructose (molecular weight: 180), ribose (molecular weight: 150), xylose (molecular weight: 150), arabinose (molecular weight: 150), galactose (molecular weight: 180), and sorbitol (molecular weight: 182); and ureas such as allyl urea (molecular weight: 100), N,N-dimethylol urea (molecular weight: 120), malonyl urea (molecular weight: 128), carbamyl urea (molecular weight: 103), 1,1-diethyl urea (molecular weight: 116), n-butyl urea (molecular weight: 116), creatinine (molecular weight: 113), and benzyl urea (molecular weight: 150). When the molecular weight is smaller than 100, a tendency of increasing the difference in viscosities at 10° C. and at 40° C. becomes large. In addition, when the molecular weight is larger than 200, the viscosity of ink containing the humectant is readily increased with the addition amount of the humectant. Therefore, the molecular weight is preferably in the range of from 100 to 200. Among these humectants, glycine betaine is particularly high in curling-preventing effect and is therefore preferred, and also commercially available products such as Aminocoat (manufactured by Asahi Kasei Chemicals) can be used.

The total amount of these humectants (A), (B), and (C) in the ink is preferably from 10 to 40% by weight from the viewpoints of curling and cockling characteristics, strike-through characteristics, and clogging characteristics.

Furthermore, the ink composition of the embodiment preferably contains a water-soluble organic solvent in order to prevent clogging near the nozzle of an ink jet head, to adequately control penetration properties and bleeding of the ink to a recording medium, and to impart drying properties to the ink. In particular, it is preferable to contain 1,2-alkanediol and/or glycol ether. Examples of the 1,2-alkanediol include 1,2-octanediol, 1,2-hexanediol, 1,2-pentanediol, and 4-methyl-1,2-pentanediol. Examples of the glycol ether include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether. These water-soluble organic solvents can be used alone or in a combination and are preferably contained in from 1 to 50% by weight in the ink from the viewpoints of ensuring adequate physical characteristic values (such as viscosity) of the ink and ensuring printing quality and reliability.

Furthermore, the ink composition preferably contains a surface tension-adjusting agent for controlling wetting properties of the ink to a recording medium and for obtaining penetration properties to a recording medium and printing stability in an ink jet recording method. The surface tension-adjusting agent is preferably an acetylene glycol surfactant or a polyether-modified siloxane. Examples of the acetylene glycol surfactant include Surfinol 420, 440, 465, 485, 104, and STG (Air Product products), Olfin PD-001, SPC, E1004, and E1010 (Nissin Chemical products), and Acetyrenol E00, E40, E100, and LH (Kawaken Fine Chemical products). Examples of the polyether-modified siloxane include BYK-346, 347, 348, and UV3530 (BYK-Chemie products). These agents may be contained in the ink composition in a combination, and it is preferable to control the surface tension to from 20 to 40 mN/m. The amount in the ink is from 0.1 to 3.0% by weight.

Furthermore, according to need, the ink composition can contain an antifoaming agent, an antioxidant, an ultraviolet absorber, a preservative/fungicide, and so on.

The pigment used in the embodiment may be any known inorganic and organic pigments, and examples thereof include, in addition to pigments such as pigment yellow, pigment red, pigment violet, pigment blue, and pigment black listed in the Color Index, pigments such as phthalocyanine, azo, anthraquinone, azomethine, and condensed ring pigments. The examples further include organic pigments such as Yellow Nos. 4, 5, 205, and 401; Orange Nos. 228 and 405; and Blue Nos. 1 and 404; and inorganic pigments such as titanium oxide, zinc oxide, zirconium oxide, iron oxide, ultramarine, iron blue, and chrome oxide. For example, C.I. pigment yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180, and 198; C.I. pigment red 1, 3, 5, 8, 9, 16, 17, 19, 22, 38, 57:1, 90, 112, 122, 123, 127, 146, 184, and 202; C.I. pigment violet 1, 3, 5:1, 16, 19, 23, and 38; C.I. pigment blue 1, 2, 15, 15:1, 15:2, 15:3, 15:4, and 16; and C.I. pigment black 1 and 7 can be used, and the ink composition may contain a plurality of pigments.

The pigment used as a resin dispersion type is preferably blended in the ink composition as a pigment dispersion prepared by dispersing the pigment together with a dispersing agent such as a polymer dispersing agent or a surfactant in an aqueous medium using a ball mill, a roll mill, a bead mill, a high-pressure homogenizer, or a high-speed agitation disperser. The pigment used as a self dispersion type is preferably blended in the ink composition as a pigment dispersion prepared by bonding a dispersibility-imparting group (hydrophilic functional group and/or its salt) to the pigment surface directly or indirectly via an alkyl group, an alkyl ether group, an aryl group, or the like so that the pigment is dispersed and/or dissolved in an aqueous solvent without using a dispersing agent and dispersing the pigment in an aqueous solvent.

Examples of the polymer as the dispersing agent include natural high molecular weight compounds such as agglutinate, gelatin, and saponin; and synthetic high molecular weight compounds such as polyvinyl alcohols, polypyrrolidones, acrylic resins (for example, polyacrylic acid, acrylic acid-acrylonitrile copolymers, vinyl acetate-acrylic acid copolymers, and vinyl acetate-acrylic acid ester copolymers), styrene-acrylic acid resins (for example, styrene-acrylic acid copolymers, styrene-methacrylic acid copolymers, styrene-methacrylic acid-acrylic acid alkyl ester copolymers, styrene-α-methylstyrene-acrylic acid copolymers, styrene-α-methylstyrene-acrylic acid-acrylic acid alkyl ester copolymers, and styrene-vinyl acetate-acrylic acid copolymers), styrene-maleic acid resins, and vinyl acetate-fatty acid vinyl-ethylene copolymer resins, and their salts. The structure of the copolymer may be any of a random type, a block type, and a graft type.

In addition, examples of the surfactant used as the dispersing agent include anionic surfactants such as fatty acid salts, higher alkyl dicarboxylates, higher alcohol sulfates, and higher alkyl sulfonates; cationic surfactants such as fatty acid amine salts and fatty acid ammonium salts; and nonionic surfactants such as polyoxyalkyl ethers, polyoxyalkyl esters, and sorbitan alkyl esters.

Among these dispersing agents, in particular, water-insoluble resins are preferred. Specifically, the dispersing agent is composed of a block copolymer resin of a monomer having a hydrophobic group and a monomer having a hydrophilic group and contains a monomer having at least a salt-forming group and has a solubility, after neutralization, of less than 1 g in 100 g of water at 25° C. Examples of the monomer having a hydrophobic group include methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters such as vinyl acetate; vinyl cyanide compounds such as acrylonitrile and methacrylonitrile; and aromatic vinyl monomers such as styrene, α-methylstyrene, vinyl toluene, 4-t-butylstyrene, chlorostyrene, vinylanisole, and vinylnaphthalene. These can be used alone or as a mixture of two or more. Examples of the monomer having a hydrophilic group include polyethylene glycol monomethacrylate, polypropylene glycol monomethacrylate, and ethylene glycol/propylene glycol monomethacrylate. These can be used alone or as a mixture of two or more. Examples of the monomer having a salt-forming group include acrylic acid, methacrylic acid, styrenecarboxylic acid, and maleic acid. These can be used alone or as a mixture of two or more. Furthermore, macromonomers such as styrene macromonomers and silicone macromonomers each having a polymerizable functional group at one end and other monomers can be used.

These water-insoluble resins are preferably used as salts neutralized with a tertiary amine such as ethylamine or trimethylamine or an alkaline neutralizer such as lithium hydroxide, sodium hydroxide, potassium hydroxide, or ammonia, and those having a weight-average molecular weight of about 10000 to 150000 are preferred for stably dispersing the pigment.

The self dispersion type pigment that can be dispersed and/or dissolved in water without using a dispersing agent is produced by, for example, subjecting a pigment to physical treatment or chemical treatment for bonding (grafting) a dispersibility-imparting group or an active species having a dispersibility-imparting group to the pigment surface. Examples of the physical treatment include vacuum plasma treatment. Examples of the chemical treatment include a wet oxidization method in which the pigment surface is oxidized with an oxidant in water and a method for bonding a carboxyl group to the pigment surface via a phenyl group by bonding a p-aminobenzoic acid to the surface. Since the ink containing the self dispersion type pigment does not need to contain a dispersing agent for dispersing a common pigment as described above, foam formation, which is caused by a decrease in defoaming properties due to a dispersing agent, hardly occurs, and thereby an ink excellent in discharge stability is easily prepared. In addition, since a large increase in viscosity due to a dispersing agent does not occur, the pigment can be contained in the ink in a larger amount to enable to sufficiently increase the printing concentration. Thus, there are advantages such that the handling is easy. Therefore, the self dispersion type pigment is particularly effective for black ink that needs a high concentration. The black ink used in the ink composition of the embodiment preferably contains at least the self dispersion type pigment that can be dispersed and/or dissolved in water without using a dispersing agent.

In the embodiment, a self dispersion type pigment having a surface subjected to oxidation treatment with hypohalous acid and/or hypohalite or oxidation treatment with ozone is preferred from the standpoint of high color development. In addition, the self dispersion type pigment may be a commercially available product such as Microjet CW-1 (trade name, manufactured by Orient Chemical Industries) or CAB-O-JET200 and CAB-O-JET300 (trade names, manufactured by Cabot).

Furthermore, these pigments in ink preferably have a volume-average particle diameter in the range of from 50 to 200 nm from the viewpoints of storage stability of the ink and prevention of clogging of a nozzle. The average particle diameter can be determined by particle size measurement with, for example, Microtrac UPA150 (manufactured by Microtrac) or particle size distribution analyzer LPA3100 (manufactured by Otsuka Electronics).

Such a pigment is preferably contained in the ink of the embodiment in a range of from 6 to 25% by weight. When the content is less than 6% by weight, the printing concentration (color development properties) may be insufficient. When the content is larger than 25% by weight, defects in reliability such as clogging of a nozzle and unstable discharging may occur.

The ink composition used in the embodiment contains a resin emulsion from the viewpoint of ensuring fixation properties to a recorded matter.

The resin emulsion preferably contains resin fine particles having a lowest film-forming temperature of lower then 20° C. Since the resin fine particles form a film at 20° C. or higher if they have a lowest film-forming temperature of lower than 20° C., the particles form a film at atmospheric temperature to improve fixation properties and abrasion resistance.

The resin emulsion is preferably at least one selected from the group consisting of acrylic resins, methacrylic resins, vinyl acetate resins, vinyl chloride resins, and styrene-acrylic resins. These resins may be used as a homopolymer or a copolymer, and may have a monophase structure or a multiphase structure (core-shell type).

Furthermore, at least any of these resin emulsions contained in the ink composition used in the embodiment is preferably blended in the ink composition in a form of emulsion of resin fine particles obtained by emulsion polymerization of an unsaturated monomer. When the resin fine particles are directly added to the ink composition, dispersion of the resin fine particles may be insufficient. Therefore, the resin fine particles in an emulsion form are preferred from the standpoint of manufacturing of the ink composition. In addition, the emulsion is preferably an acrylic emulsion from the viewpoint of storage stability of the ink composition.

The emulsion of the resin fine particles (for example, acrylic emulsion) can be formed by a known emulsion polymerization. For example, the emulsion can be obtained by emulsion-polymerizing an unsaturated monomer (for example, unsaturated vinyl monomer) in water in the presence of a polymerization initiator and a surfactant.

The unsaturated monomer is that usually used in emulsion polymerization, and examples thereof include acrylic acid ester monomers, methacrylic acid ester monomers, aromatic vinyl monomers, vinyl ester monomers, vinyl cyanide compound monomers, halogenated monomers, olefin monomers, and diene monomers.

Specific examples include acrylic acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters such as vinyl acetate; vinyl cyanide compounds such as acrylonitrile and methacrylonitrile; halogenated monomers such as vinylidene chloride and vinyl chloride; aromatic vinyl monomers such as styrene, α-methylstyrene, vinyl toluene, 4-t-butylstyrene, chlorostyrene, vinylanisole, and vinylnaphthalene; olefins such as ethylene and propylene; dienes such as butadiene and chloroprene; vinyl monomers such as vinyl ether, vinyl ketone, and vinyl pyrrolidone; unsaturated carboxylic acids such as acrylic acid, methacrylic acid, itaconic acid, fumaric acid, and maleic acid; acrylamides such as acrylamide, methacrylamide, N,N'-dimethyl acrylamide; hydroxyl group-containing monomers such as 2-hydroxyethyl acrylate, 2-hydroxypropyl acrylate, 2-hydroxyethyl methacrylate, and 2-hydroxypropyl methacrylate. These can be used alone or in a mixture of two or more.

In addition, a cross-linkable monomer having two or more polymerizable double bonds can be used. Examples of the cross-linkable monomer having two or more polymerizable double bonds include diacrylate compounds such as polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds such as trimethylolpropane triacrylate, trimethylolethane triacrylate, and tetramethylolmethane triacrylate; tetraacrylate compounds such as ditrimethylol tetraacrylate, tetramethylolmethane tetraacrylate, and pentaerythritol tetraacrylate; hexaacrylate compounds such as dipentaerythritol hexaacrylate; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds such as trimethylolpropane trimethacrylate and trimethylolethane trimethacrylate; methylene bisacrylamide; and divinylbenzene. These can be used alone or in a mixture of two or more.

Furthermore, in the emulsion polymerization, in addition to the polymerization initiator and the surfactant, a chain transfer agent and also, for example, a neutralizer may be used according to a common method. In particular, the neutralizer is preferably ammonia or an inorganic alkali hydroxide such as sodium hydroxide or potassium hydroxide.

In the embodiment, the resin emulsion is preferably contained in the ink composition in the range of from 1 to 10% by weight from the viewpoint of more effectively obtaining ink jet characteristic physical values, reliabilities (such as clogging and discharge stability), and fixation properties of the ink composition.

At the same time, the volume-average particle size of the resin emulsion used in the ink composition is preferably from 20 to 200 nm from the viewpoint of dispersion stability in the ink.

The ink composition of the embodiment can be suitably applied to writing materials such as pens and to stamps and also further suitably used as an ink composition for ink jet recording. The ink jet recording system in the embodiment means a system for discharging an ink composition as droplets from a fine nozzle and making the droplets adhere to a recording medium. It will be specifically described below.

A first method is an electrostatic aspiration system. In this system, recording is performed by applying a strong electric field between a nozzle and an acceleration electrode placed in front of the nozzle, continuously discharging droplets of ink from the nozzle, and supplying a printing information signal to deflecting electrodes while the ink droplets are traveling between the deflecting electrodes; or discharging ink droplets corresponding to the printing information signal without deflecting the ink droplets.

A second method is a system of forcefully discharging ink droplets by applying a pressure to ink solution using a small pump and mechanically vibrating a nozzle with a crystal oscillator or the like. Recording is performed by electrically charging the discharged ink droplets when they are discharged and supplying a printing information signal to deflecting electrodes while the ink droplets are traveling between the deflecting electrodes.

A third method is a system using a piezoelectric element, and recoding is performed by simultaneously applying a pressure and a printing information signal to ink solution with the piezoelectric element and discharging the ink droplets.

A fourth method is a system of sharply expanding the volume of ink solution by the effect of thermal energy, and recording is performed by heating the ink solution to form foams using a micro electrode according to a printing information signal and discharging the ink droplets.

Any of the above-mentioned systems can be used in the ink jet recording method using the ink composition of the embodiment.

The recorded matter of the embodiment is that recorded using at least the above-described ink composition. The recorded matter is excellent in safety and stability of the ink by using the ink composition of the embodiment. Thus, it is possible to provide an ink composition always achieving the same recording quality to various recording media regardless of the using temperature and simultaneously showing excellent curling and cockling characteristics, strike-through resistance, both-side printing characteristics, and fixation properties to plain paper and to provide a recording method and a recorded matter using the ink composition.

Examples

The embodiment will be described in further detail with reference to Examples below, but the embodiment is not limited to these Examples.

Preparation of Colorant Dispersion

Pigment Dispersion B1

One hundred grams of Color Black 5170 (trade name, manufactured by Degussa-Huls), which is commercially available carbon black, were mixed with 1 kg of water, followed by pulverization with a ball mill using zirconium beads. The resulting undiluted solution after pulverization was subsequently pulverized with the ball mill, while 1400 g of sodium hypochlorite (effective chlorine concentration: 12%) were dropwise added thereto, for 5 hours for a reaction. Then, the mixture was boiled for 4 hours with stirring for wet oxidization. The resulting undiluted dispersion was filtered through a glass-fiber filter GA-100 (trade name, manufactured by Advantec Toyo), followed by washing with water. The resulting wet cake was redispersed in 5 kg of water and dechlorinated and purified with reverse osmosis membrane until the conductivity became 2 mS/cm, followed by concentration until the pigment concentration reached 20% by weight to prepare a pigment dispersion B1.

The average particle size of the pigment of this dispersion was 110 nm when measured by particle size distribution measurement with Microtrac UPA150 (manufactured by Microtrac).

Pigment Dispersion B2

The pigment dispersion B1 prepared above was dried under reduced pressure at 40° C. for 3 days to remove water. The resulting paste was weighed in a round bottom flask, and triethylene glycol monobutyl ether was added to the flask to give a solid content concentration of 20% by mass, followed by stirring with a magnetic stirrer for 24 hours. Subsequently, the round bottom flask containing the triethylene glycol monobutyl ether dispersion was set to an ultrasonic washing tank. The air in the dispersion was completely substituted by triethylene glycol monobutyl ether by deaeration under reduced pressure for 8 hours using an aspirator while performing ultrasonic dispersion to give a pigment dispersion B2.

Pigment Dispersion Y1

Twenty parts by weight of an organic solvent (methyl ethyl ketone), 0.03 parts by weight of a polymerization chain transfer agent (2-mercaptoethanol), a polymerization initiator, and each monomer shown in Table 1 were put in a reaction vessel that was subjected to sufficient nitrogen gas substitution, followed by stirring at 75° C. for polymerization. Forty parts by weight of methyl ethyl ketone dissolving 0.9 parts by weight of 2,2'-azobis(2,4-dimethylvaleronitrile) was added to 100 parts by weight of the monomer component, followed by aging at 80° C. for 1 hour to give a polymer solution.

TABLE 1

| Composition of monomer mixture (% by weight) | |
| --- | --- |
| Methacrylic acid | 15 |
| Styrene monomer | 30 |
| Benzyl methacrylate | 20 |
| Polyethylene glycol monomethacrylate (EO = 15) | 10 |
| Polypropylene glycol monomethacrylate (PO = 9) | 10 |
| Styrene macromonomer | 15 |

The resulting polymer solution was dried under reduced pressure. Five parts of the resulting product was dissolved in 15 parts of methyl ethyl ketone, and the polymer was neutralized with an aqueous solution of sodium hydroxide. Furthermore, 15 parts of C.I. pigment yellow 74 was added thereto, followed by kneading with a disperser while adding water thereto. To the resulting kneaded product, 100 parts of ion-exchanged water was added, followed by stirring. Then, the methyl ethyl ketone was removed under reduced pressure at 60° C. Furthermore, part of water was removed to give a water dispersion of the yellow pigment having a solid content concentration of 200 by weight as a pigment dispersion Y1.

The average particle size of the pigment of this dispersion was 100 nm when measured by particle size distribution measurement with Microtrac UPA150 (manufactured by Microtrac).

Pigment Dispersion M1

A pigment dispersion M1 was prepared as in the pigment dispersion Y1 except that C.I. pigment red 122 was used instead of C.I. pigment yellow 74 in the pigment dispersion Y1.

The average particle size of the pigment of this dispersion was 140 nm when measured by particle size distribution measurement with Microtrac UPA150 (manufactured by Microtrac).

Pigment Dispersion C1

A pigment dispersion C1 was prepared as in the pigment dispersion Y1 except that C.I. pigment blue 15:4 was used instead of C.I. pigment yellow 74 in the pigment dispersion Y1.

The average particle size of the pigment of this dispersion was 80 nm when measured by particle size distribution measurement with Microtrac UPA150 (manufactured by Microtrac).

Preparation of Resin Emulsion

Resin fine particles (polymer 1) having a lowest film-forming temperature of less than 20° C. was produced by polymerizing 600 g of methyl methacrylate, 125 g of butyl acrylate, 30 g of methacrylic acid, and 5 g of triethylene glycol diacrylate to 20 g of acrylamide. The polymer particles had an average particle size of 50 nm and a lowest film-forming temperature of 10° C. The average particle size of the polymer particles was measured with Coulter Counter N4 (trade name, manufactured by Coulter).

Similarly, resin fine particles (polymer 2) having a lowest film-forming temperature of 20° C. or higher was produced by polymerizing 600 g of styrene, 200 g of butyl acrylate, and 30 g of methacrylic acid to 20 g of acrylamide. The polymer particles had an average particle size of 130 nm and a lowest film-forming temperature of 36° C.

Preparation of Ink

Each component was mixed at the ratio shown in Table 2 and stirred at room temperature for 2 hours, followed by filtration through a membrane filter with a pore size of 5 μm to prepare each ink. Note that the addition amounts shown in Table 2 are all % by weight concentrations and that the figures in parentheses of the colorant dispersion are solid content concentrations of the colorants. In addition, the term "balance" in the ion-exchanged water means the addition of ion-exchanged water in a manner that the total amount of ink becomes 100 parts.

TABLE 2

| | Ink 1 | Ink 2 | Ink 3 | Ink 4 | Ink 5 | Ink 6 | Ink 7 |
| --- | --- | --- | --- | --- | --- | --- | --- |
| B1 | 40 (8) | — | — | — | — | — | — |
| B2 | — | — | — | — | — | — | — |
| Yellow pigment dispersion Y1 | — | 50 (7.5) | — | — | — | — | — |
| Magenta pigment dispersion M1 | — | — | 50 (7.5) | — | 50 (7.5) | 50 (7.5) | 33.33 (5) |
| Cyan pigment dispersion C1 | — | — | — | 50 (7.5) | — | — | — |
| 249 resin emulsion polymer 1 | 6.67 (2) | 6.67 (2) | 6.67 (2) | 6.67 (2) | 6.67 (2) | — | 6.67 (2) |
| resin emulsion polymer 2 | — | — | — | — | — | — | — |
| (A) glycerin | 10 | 8 | 8 | 8 | 8 | 8 | 8 |
| (A) TEG | 2 | 2 | 2 | 2 | 2 | 2 | 2 |
| (B) TMP | 4 | 4 | 4 | 4 | 4 | 4 | 4 |
| (C) Aminocoat | 12 | 10 | 16 | 16 | — | 10 | 16 |
| (C) sorbitol | — | — | — | — | 16 | — | — |
| 2-pyrrolidone | 2 | 3 | 3 | 3 | 3 | 3 | 3 |
| TEGMBE | 5 | 3 | 3 | 3 | 3 | 3 | 3 |
| 1,2-hexanediol | — | 2 | 2 | 2 | 2 | 2 | 2 |
| Surfinol 465 | — | 0.5 | 0.2 | 0.4 | 0.2 | 0.5 | 0.2 |
| Olfin E1010 | 1 | 0.5 | 1 | 0.4 | 1 | 0.5 | 1 |
| Triethanol amine | — | 1 | — | 1 | — | 1 | — |
| Na2EDTA | 0.01 | 0.01 | 0.01 | 0.01 | 0.01 | 0.01 | 0.01 |
| water | bal | bal | bal | bal | bal | bal | bal |
| water content | 53.99 | 53.99 | 48.79 | 48.19 | 48.79 | 55.99 | 51.52 |
| (A):(B):(C) ratio | 1.0:0.33:1.0 | 1.0:0.4:1.0 | 1.0:0.4:1.6 | 1.0:0.4:1.6 | 1.0:0.4:1.6 | 1.0:0.4:1.6 | 1.0:0.4:1.6 |

TABLE 2-continued

|  | Ink 8 | Ink 9 | Ink 10 | Ink 11 | Ink 12 | Ink 13 | Ink 14 |
|---|---|---|---|---|---|---|---|
| B1 | — | — | — | — | — | — | 40 (8) |
| B2 | — | — | — | — | — | — | — |
| Yellow pigment dispersion Y1 | — | — | — | — | — | — | — |
| Magenta pigment dispersion M1 | 50 (7.5) | 50 (7.5) | 50 (7.5) | 50 (7.5) | — | 50 (7.5) | — |
| Cyan pigment dispersion C1 | — | — | — | — | — | — | — |
| 249 | — | — | — | — | 7.5 | — | — |
| resin emulsion polymer 1 | 6.67 (2) | 6.67 (2) | 6.67 (2) | 6.67 (2) | 6.67 (2) | — | — |
| resin emulsion polymer 2 | — | — | — | — | — | 6.67 (2) | — |
| (A) glycerin | 30 | — | 4 | 4 | 8 | 8 | 10 |
| (A) TEG | — | — | 1 | 1 | 2 | 2 | 2 |
| (B) TMP | — | 30 | 2 | 2 | 4 | 4 | 4 |
| (C) Aminocoat | — | — | 17.5 | 8 | 16 | 16 | 12 |
| (C) sorbitol | — | — | — | — | — | — | — |
| 2-pyrrolidone | 3 | 3 | 3 | 3 | 3 | 3 | 2 |
| TEGMBE | 3 | 3 | 3 | 3 | 3 | 3 | 18 |
| 1,2-hexanediol | 2 | 2 | 2 | 2 | 2 | 2 | — |
| Surfinol 465 | 0.2 | 0.2 | 0.5 | 0.2 | 0.2 | 0.2 | — |
| Olfin E1010 | 1 | 1 | 0.5 | 1 | 1 | 1 | 1 |
| Triethanol amine | — | — | 1 | — | — | — | — |
| Na2EDTA | 0.01 | 0.01 | 0.01 | 0.01 | 0.01 | 0.01 | 0.01 |
| water | bal | bal | bal | bal | bal | bal | bal |
| water content | 48.79 | 48.79 | 55.49 | 62.99 | 51.29 | 48.79 | 42.99 |
| (A):(B):(C) ratio | 1.0:0:0 | 0:1.0:0 | 1.0:0.4:3.5 | 1.0:0.4:1.6 | 1.0:0.4:1.6 | 1.0:0.4:1.6 | 1.0:0.33:1.0 |

|  | Ink 15 | Ink 16 | Ink 17 | Ink 18 | Ink 19 |
|---|---|---|---|---|---|
| B1 | 40 (8) | — | 40 (8) | — | — |
| B2 | — | 40 (8) | — | — | 40 (8) |
| Yellow pigment dispersion Y1 | — | — | — | — | — |
| Magenta pigment dispersion M1 | — | — | — | 50 (7.5) | — |
| Cyan pigment dispersion C1 | — | — | — | — | — |
| 249 | — | — | — | — | — |
| resin emulsion polymer 1 | — | — | 6.67 (2) | — | — |
| resin emulsion polymer 2 | — | — | — | — | — |
| (A) glycerin | 10 | 10 | 6 | 4 | 10 |
| (A) TEG | 2 | 2 | — | 1 | 2 |
| (B) TMP | 4 | 4 | — | 2 | 4 |
| (C) Aminocoat | — | 12 | 24 | 8 | 12 |
| (C) sorbitol | 12 | — | — | — | — |
| 2-pyrrolidone | 2 | 2 | 2 | 3 | 2 |
| TEGMBE | 18 | 18 | 5 | 3 | 20 |
| 1,2-hexanediol | — | — | — | 2 | — |
| Surfinol 465 | — | — | — | 0.2 | — |
| Olfin E1010 | 1 | 1 | 1 | 1 | 1 |
| Triethanol amine | — | — | — | — | — |
| Na2EDTA | 0.01 | 0.01 | 0.01 | 0.01 | 0.01 |
| water | bal | bal | bal | bal | bal |
| water content | 42.99 | 10.99 | 53.99 | 65.79 | 8.99 |
| (A):(B):(C) ratio | 1.0:0.33:1.0 | 1.0:0.33:1.0 | 1.0:0:4.0 | 1.0:0.4:1.6 | 1.0:0.33:1.0 |

Ink 1 to 19: Ink manufacturing examples 1 to 19
B1: Black pigment dispersion B1
B2: Black pigment dispersion B2
249: Dye acid red 249
(A) TEG: (A) triethylene glycol
(B) TMP: (B) trimethylol propane
(C) Aminocoat: (C) Aminocoat (trimethylglycine)
TEGMBE: triethylene glycol monobutyl ether
Na2EDTA: disodium ethylenediaminetetraacetate
water: ion-exchanged water
bal: balance Evaluation of Ink Composition Test 1: Strike-Through of Ink The resulting ink compositions were each used in 100% duty solid printing (paper setting: plain paper, printing mode: clear) using PX-B500 (manufactured by Seiko Epson) on the following three types of plain paper: Xerox P (manufactured by Fuji Xerox), Xerox 4024 (manufactured by Xerox Co.), and Recycle Cut R-100 (manufactured by Oji Paper). The resulting recorded matters were each left under environment of 24° C. for 24 hours, and then the reverse side of the printed surface was visually evaluated for strike-through of the ink. The evaluation criteria are as follows:

A: strike-through of ink is hardly observed,

B: strike-through of ink is observed, but it does not influence printing on the reverse face, and C: significant strike-through of ink is observed, and it interferes with printing on the reverse face.

The evaluation results are shown in Table 3.

Test 2: Cockling

A solid printed patch in a 10×10 cm square was printed on Recycle Cut R-100 (manufactured by Oji Paper) using the same ink jet printer as in above. The degree of unevenness (cockling) of each recorded medium was measured using a laser displacement meter LK-010 (manufactured by Keyence) and evaluated by the following evaluation criteria:

A: less than 0.5 mm,

B: 0.5 mm or more and less than 1.0 mm,

C: 1.0 mm or more and less than 2.0 mm, and

D: 2.0 mm or more.

The evaluation results are shown in Table 3.

Test 3: Curling

Solid printing was conducted on Recycle Cut R-100 (manufactured by Oji Paper) with a margin of 0.5 cm on each side of the paper using the same ink jet printer as in above. After the printing, the paper was left under environment of 24° C. for 24 hours. Then, the degrees of curling at the four corners were measured, and the average thereof was evaluated by the following criteria:

A: less than 1.0 cm,

B: 1.0 cm or more and less than 5.0 cm, and

C: larger than 5.0 cm.

The evaluation results are shown in Table 3.

Test 4: Fixation properties immediate after printing

A solid printed patch in a 10×10 cm square was printed (paper setting: gloss paper, printing mode: clear) on gloss paper, Epson photographic paper (gloss) (manufactured by Seiko Epson), using the same ink jet printer as in above. Immediately after the printing, the printed surface was strongly rubbed with a finger, and then the condition of the printed surface was visually observed. The evaluation criteria are as follows:

A: ink is slightly taken off, but the finger is not stained, and

B: ink is taken off, and also the finger is stained.

The evaluation results are shown in Table 3.

Test 5: Clogging Recovery

Printing was continuously performed for 10 minutes using the same ink jet printer as in above to confirm that all nozzles normally discharge ink. Then, the ink cartridge was removed, and the recording head was left under environment of 40° C. for one week in the state that the head cap was removed. After the leaving, cleaning operation was repeated until all the nozzles discharge in a state equal to the initial state. The easiness of recovery was evaluated by the following evaluation criteria:

A: recovery to a state equal to the initial state by less than 6 times of the cleaning operation, B: recovery to a state equal to the initial state by 6 to 8 times of the cleaning operation, and C: recovery to a state equal to the initial state by 9 or more times of the cleaning operation.

The evaluation results are shown in Table 3.

Test 6: Evaluation of Optical Concentration (OD Value)

The OD values of the patch portions used in the test 1 were measured five times using a Gretag densitometer (manufactured by GregtagMacbeth). The average value of each ink composition was determined, and the calculated average OD value was evaluated as optical concentration value (OD value) by the following evaluation criteria:

A: 1.2 or higher,

B: 1.1 or higher and less than 1.2, and

C: less than 1.1.

The evaluation results are shown in Table 3.

Test 7: Viscosity-temperature characteristics

The viscosities at 10° C. and 40° C. of each ink composition were measured with a Cannon-Fenske reverse-flow viscometer VM-252C (manufactured by Rigo). Then, the ratio of viscosity values at 10° C. and 40° C. of each ink composition (viscosity value at 10° C./viscosity value at 40° C.) was determined. The viscosity-temperature characteristics of ink were evaluated by the following evaluation criteria:

A: less than 2.5,

B: 2.5 or higher and less than 3.0, and

C: 3.0 or higher.

TABLE 3

| | Example | | | | | | | | | | | | Comparative Exampe | | | | | | |
|---|---|---|---|---|---|---|---|---|---|---|---|---|---|---|---|---|---|---|---|
| | Ink 1 | Ink 2 | Ink 3 | Ink 4 | Ink 5 | Ink 6 | Ink 7 | Ink 10 | Ink 13 | Ink 14 | Ink 15 | Ink 16 | Ink 8 | Ink 9 | Ink 11 | Ink 12 | Ink 17 | Ink 18 | Ink 19 |
| Test 1 | A | A | A | A | A | A | A | A | A | A | A | A | C | A | A | C | B | A | A |
| Test 2 | A | A | A | A | A | A | A | A | A | A | A | A | C | C | C | C | B | C | A |
| Test 3 | A | A | A | A | A | A | A | A | A | A | A | A | D | D | D | D | A | D | A |
| Test 4 | A | A | A | A | A | C | A | A | B | B | C | B | A | A | A | A | C | C | C |
| Test 5 | A | A | A | A | A | A | A | B | A | A | A | B | A | A | A | A | C | A | C |
| Test 6 | A | A | A | A | A | A | B | A | A | A | A | A | A | A | A | C | A | A | A |
| Test 7 | A | A | A | A | A | A | A | A | A | A | A | B | C | C | A | A | A | A | B |

Ink 1 to 19: Ink manufacturing examples 1 to 19

Test 1: strike-through evaluation

Test 2: cockling evaluation

Test 3: curling evaluation

Test 4: fixation property evaluation

Test 5: clogging evaluation

Test 6: color development property evaluation

Test 7: viscosity characteristic evaluation

As obvious from Table 3, according to the ink composition of the embodiment, the difference in viscosity due to ink temperature can be reduced, and excellent curling and cockling characteristics, strike-through resistance, both-side printing characteristics, color development properties, and fixation properties can be provided. The ink composition is thus suitable to be used in an ink jet recording system.

The invention is not limited to the above-described embodiment and can be applied to the use as ink for writing materials or ink for offset printing.

What is claimed is:

1. An ink composition comprising at least a pigment, a water-soluble organic solvent, a humectant, and water in an amount from 10 to 60% by weight to of the total amount of the ink composition, wherein the water-soluble organic solvent is 1,2-alkanediol and/or glycol ether, and wherein the humectant is a mixture of the following compounds (A), (B), and (C):
   (A) at least one compound selected from glycerin, 1,2,6-hexanetriol, diethylene glycol, triethylene glycol, tetraethylene glycol, and dipropylene glycol,
   (B) either trimethylol propane or trimethylol ethane, or a mixture thereof, and
   (C) at least one compound selected from the group consisting of betaines, saccharides, and ureas and having a molecular weight in the range of from 100 to 200,
   at a content weight ratio of (A):(B):(C) of 1.0:0.1 to 1.0:1.0 to 3.5.

2. The ink composition according to claim 1, wherein the concentration of the pigment contained in the ink composition is 6% by weight or more.

3. The ink composition according to claim 1, further comprising a resin emulsion.

4. The ink composition according to claim 3, wherein the resin emulsion has a lowest film-forming temperature of lower than 20° C.

5. The ink composition according to claim 1, wherein the viscosity value of the ink composition at 20° C. is from 5 to 20 mPa·s.

6. An ink jet recording method comprising discharging droplets of an ink composition according to claim 1 and making the droplets adhere to a recording medium.

7. The ink composition according to claim 1, wherein the water-soluble organic solvent comprises 1,2-alkanediol.

8. The ink composition according to claim 1, wherein the water-soluble organic solvent comprises glycol ether.

* * * * *